(12) United States Patent
Nagaoka et al.

(10) Patent No.: US 8,973,430 B2
(45) Date of Patent: Mar. 10, 2015

(54) DIESEL PARTICULATE FILTER SYSTEM

(75) Inventors: Daiji Nagaoka, Fujisawa (JP); Teruo Nakada, Fujisawa (JP); Hiroyuki Yuza, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 12 days.

(21) Appl. No.: 13/994,356

(22) PCT Filed: Dec. 7, 2011

(86) PCT No.: PCT/JP2011/078283
§ 371 (c)(1),
(2), (4) Date: Jun. 14, 2013

(87) PCT Pub. No.: WO2012/081463
PCT Pub. Date: Jun. 21, 2012

(65) Prior Publication Data
US 2013/0269427 A1    Oct. 17, 2013

(30) Foreign Application Priority Data
Dec. 16, 2010    (JP) ................................. 2010-280888

(51) Int. Cl.
*F01N 11/00* (2006.01)
*B01D 46/00* (2006.01)
(Continued)

(52) U.S. Cl.
CPC .......... *F01N 11/002* (2013.01); *B01D 46/0063* (2013.01); *B01D 46/448* (2013.01);
(Continued)

(58) Field of Classification Search
CPC ......... Y02T 10/47; F01N 3/208; F01N 11/00; F01N 3/2033; B01D 2279/30
USPC ...................................................... 73/114.69
See application file for complete search history.

(56) References Cited

U.S. PATENT DOCUMENTS

| | | | |
|---|---|---|---|
| 8,549,839 B2 * | 10/2013 | Barasa | 60/286 |
| 2011/0265458 A1 * | 11/2011 | Barasa | 60/286 |
| 2012/0060478 A1 * | 3/2012 | Vernassa et al. | 60/274 |

FOREIGN PATENT DOCUMENTS

| | | |
|---|---|---|
| JP | 4417878 | 11/2006 |
| JP | 4561467 | 11/2006 |

(Continued)

OTHER PUBLICATIONS

Patent Abstracts of Japan, Publication No. 2009-085079, Published Apr. 23, 2009.

(Continued)

*Primary Examiner* — Freddie Kirkland, III
(74) *Attorney, Agent, or Firm* — Staas & Halsey LLP

(57) ABSTRACT

A diesel particulate filter ("DPF") system is provided with temperature sensors at an entrance side and an exit side of a diesel oxidation catalyst, an SV ratio determining device that determines an exhaust gas SV ratio by measuring flow rate of exhaust gas during the DPF forcible regeneration, and an injector diagnosing device including a heat-generation region determining unit to which detection values of the temperature sensors and a determination value of the SV ratio determining device are input to determine whether or not these values are within a theoretical heat-generation region, and an actual injection amount diagnosing unit that diagnoses a decrease amount in an actual injection amount of an exhaust pipe injector, when the detection values of the temperature sensors and the determination value of the SV ratio determining device are within the theoretical heat-generation region.

4 Claims, 3 Drawing Sheets

(51) Int. Cl.
*B01D 46/44* (2006.01)
*F01N 3/025* (2006.01)

(52) U.S. Cl.
CPC .......... *F01N3/0253* (2013.01); *B01D 2279/30* (2013.01); *F01N 2560/06* (2013.01); *F01N 2900/06* (2013.01); *F01N 2900/1821* (2013.01); *Y02T 10/47* (2013.01)
USPC .................................................... 73/114.69

(56) References Cited

FOREIGN PATENT DOCUMENTS

| | | |
|---|---|---|
| JP | 2009-85079 | 4/2009 |
| JP | 2009-228589 | 10/2009 |
| JP | 2010-31833 | 2/2010 |
| JP | 2010-121514 | 6/2010 |
| JP | 2010-144626 | 7/2010 |

OTHER PUBLICATIONS

Patent Abstracts of Japan, Publication No. 2010-121514, Published Jun. 3, 2010.
Patent Abstracts of Japan, Publication No. 2009-228589, Published Oct. 8, 2009.
Patent Abstracts of Japan, Publication No. 2006-316758, Published Nov. 24, 2006.
Patent Abstracts of Japan, Publication No. 2010-144626, Published Jul. 1, 2010.
Patent Abstracts of Japan, Publication No. 2006-316757, Published Nov. 24, 2006.
Patent Abstracts of Japan, Publication No. 2010-031833, Published Feb. 2, 2010.
International Search Report of PCT/JP2011/078283 mailed Mar. 13, 2012.
Written Opinion of the International Searching Authority mailed Mar. 13, 2012 in corresponding International Application No. PCT/JP2011/078283.

* cited by examiner

DIESEL PARTICULATE FILTER SYSTEM

CROSS-REFERENCE TO RELATED APPLICATIONS

This application claims the foreign priority benefit of Japanese Patent Application No. 2010-280888 filed Dec. 16, 2010, the contents of which are incorporated herein by reference, which serves as priority for PCT Application No. JP2011/078283 filed Dec. 7, 2011.

TECHNICAL FIELD

The present invention relates to a diesel particulate filter ("DPF") system that traps particulate matter from exhaust gas of a diesel engine using a DPF and removes the trapped particulate matter by combustion through an exhaust pipe injection.

BACKGROUND ART

Recently, a DPF apparatus has been developed in order to purify PM (Particulate Matter) from exhaust gas of a diesel engine. Further, an LNT (Lean $NO_x$ Trap) catalyst has been developed in order to purify $NO_x$ contained in the exhaust gas. In a DPF system where an exhaust gas purification apparatus is connected to an exhaust pipe, when the purification efficiency of the purification apparatus is decreased, the combustion and removal (DPF forcible regeneration) of PM deposited on the DPF using high-temperature exhaust gas or the rich reduction of the LNT catalyst is performed by adding unburned fuel to the exhaust gas and then oxidizing and combusting the added unburned fuel with a DOC (Diesel Oxidation Catalyst) provided in the exhaust pipe.

An exhaust pipe injection has come into the spotlight as means of adding the unburned fuel to the exhaust gas in that EGR (Exhaust Gas Recirculation) control can be performed without occurrence of oil dilution in an engine cylinder even when fuel is added to hold down fuel consumption required for raising the temperature. The exhaust pipe injection is a method of adding the unburned fuel to the exhaust gas from an exhaust pipe injector provided in an exhaust pipe (for example, see Patent Documents 1 and 2). In addition, the exhaust pipe injection can perform an air-fuel ratio rich control of the exhaust gas regardless of engine combustion during the rich reduction of the LNT catalyst.

In the DPF system using the exhaust pipe injection, it is desirable to lower variation in flow rate of an exhaust injection amount from an exhaust pipe injector in order to stably perform the PM combustion and the rich reduction.

PRIOR ART DOCUMENTS

Patent Document 1: Japanese Patent Publication No. 4417878
Patent Document 2: Japanese Patent Publication No. 4561467
Patent Document 3: Japanese Patent Application Publication No. 2010-121514

Variation in flow rate of the above-described exhaust pipe injector is caused by, for example, a clogging due to a manufacturing variation or age deterioration of an injector. If the variation in the flow rate increases, the exhaust injection amount becomes unstable beyond a correction limit even though a feedback (FB) control of injection amount is performed by a temperature of exhaust gas, and thus there is a high possibility capable of not performing a stable temperature control.

As a result, there is a possibility that the temperature of the exhaust gas becomes unstable and thus DPF regeneration becomes insufficient. Further, in a case of using in the rich reduction of the LNT catalyst, there is also a possibility that the amount of reduction agents is varied during the rich reduction, resulting in poor $NO_x$ reduction or HC slip.

SUMMARY OF THE INVENTION

The present invention has been designed to solve these problems, and an object thereof is to provide a DPF system capable of performing the DPF regeneration with a suitable exhaust injection amount even when the change in the injection amount occurs due to the manufacturing variation or the aged deterioration of the exhaust pipe injector.

In order to achieve the above object, there is provided a DPF system for performing a DPF forcible regeneration that combusts and removes PMs deposited in a DPF by injecting fuel from an exhaust pipe injector and oxidizing and combusting the injected fuel with a DOC, the DPF system including: temperature sensors that are provided on an entrance side and an exit side of the DOC to detect a DOC entrance temperature and a DOC exit temperature during the DPF forcible regeneration; a space velocity (SV) ratio determining device that determines an exhaust gas SV ratio by measuring flow rate of exhaust gas during the DPF forcible regeneration; and an injector diagnosing device including: a heat-generation region determining unit to which detection values of the temperature sensors and a determination value of the SV ratio determining device are input to determine whether or not these values are within an theoretical heat-generation region; and an actual injection amount diagnosing unit that diagnoses a decrease amount in an actual injection amount of the exhaust pipe injector, when the detection values of the temperature sensors and the determination value of the SV ratio determining device are within the theoretical heat-generation region.

It is preferable that the actual injection amount diagnosing unit performs an integration by calculating an actual heat-generation amount of the DOC from a temperature difference between the entrance and the exit of the DOC and the flow rate of the exhaust gas and performs an integration by calculating an theoretical heat-generation amount of the DOC from an indication-injection amount of the exhaust pipe injector to diagnose the decrease amount in the actual injection amount of the exhaust pipe injector from integration values of the actual heat-generation amount and the theoretical heat-generation amount.

It is preferable that the injector diagnosing device corrects the indication-injection amount of the exhaust pipe injector based on the decrease amount in the diagnosed actual injection amount.

It is preferable that the injector diagnosing device sets a correction coefficient for correcting the indication-injection amount of the exhaust pipe injector based on the decrease amount in the diagnosed actual injection amount and detects a failure of the exhaust pipe injector when the correction coefficient exceeds a failure determining threshold value which is previously set.

According to the present invention, it is possible to provide a DPF system capable of performing DPF regeneration with a suitable exhaust injection amount even when the change in the injection amount occurs due to the manufacturing variation or the aged deterioration of an exhaust pipe injector.

DETAILED DESCRIPTION

Preferred embodiments of the present invention will be described below with reference to the drawings.

Figure 1:
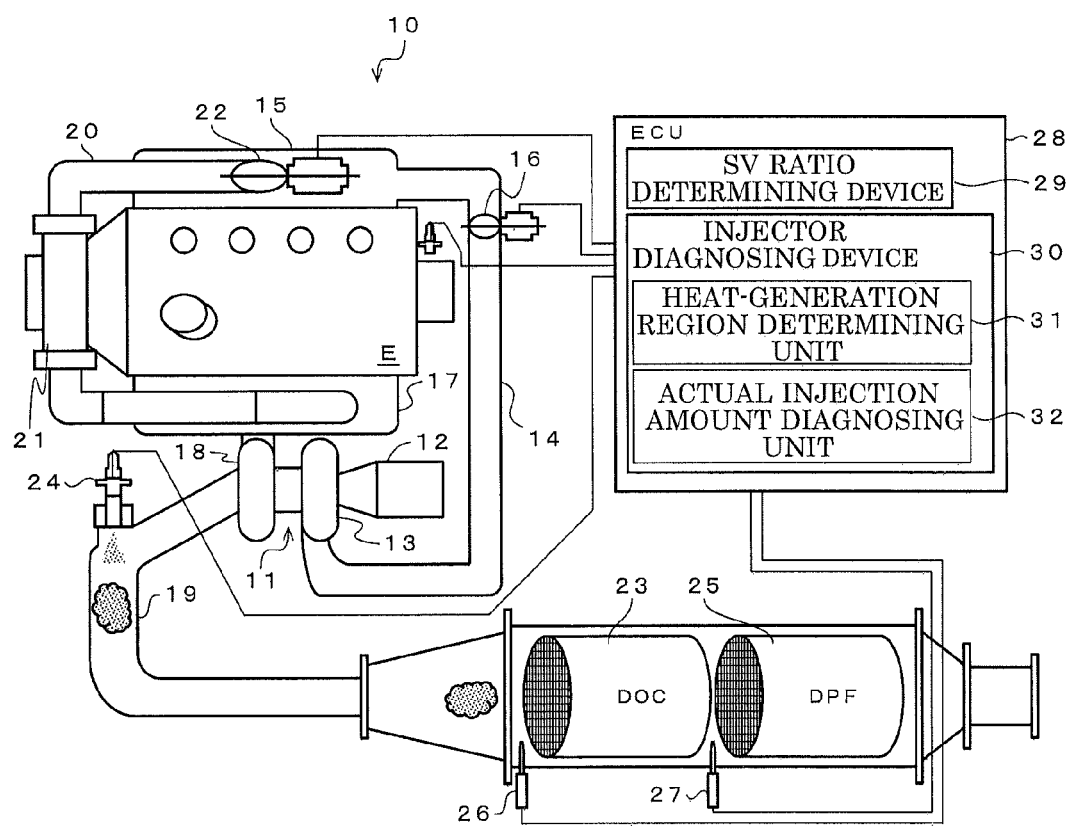
FIG. 1 is a schematic diagram illustrating a configuration of a DPF system according to the present invention.

FIG. 1 is a schematic diagram illustrating a configuration of a DPF system according to the present embodiment.

A DPF system 10 according to the present embodiment is equipped with a turbocharger 11 to compress air inhaled from an air cleaner 12 with a compressor 13 of the turbocharger 11 and feed it to an intake passage 14 by pressure at the same time, resulting in supplying the air to an engine E from an intake manifold 15 connected to the intake passage 14. The intake passage 14 is provided with an intake valve 16 which adjusts air masses into the engine E.

Exhaust gas to be discharged from the engine E are introduced to a turbine 18 of the turbocharger 11 from an exhaust manifold 17 to drive the turbine 18 and are exhausted into an exhaust pipe 19.

The DPF system 10 is provided with an EGR pipe 20 which allows the intake manifold 15 to be connected to the exhaust manifold 17, an EGR cooler 21 which cools the exhaust gas passing through the EGR pipe 20, and an EGR valve 22 which adjusts amounts of the exhaust gas for circulating from the exhaust manifold 17 to the intake manifold 15 to perform an EGR control that reduces $NO_x$ amount of an engine out by circulating a part of exhaust gas to an intake side.

A DOC 23 is disposed in the exhaust pipe 19. Here, an exhaust pipe injector 24 is provided to the exhaust pipe 19 on an upstream side of the DOC 23 and a DPF 25 is provided to the exhaust pipe 19 on a downstream side of the DOC 23 to trap PM from the exhaust gas. In the present invention, moreover, an exhaust gas purification apparatus for connecting to the exhaust pipe 19 is not limited to the DPF 25, but, for example, an LNT catalyst or an HC-SCR (HydroCarbon-Selective Catalytic Reduction) apparatus other than the DPF 25 may be provided to the exhaust pipe.

In the exhaust pipe 19, furthermore, temperature sensors 26 and 27 are provided at an entrance side (upstream side) and an exit side (downstream side) of the DOC 23 to detect a DOC entrance temperature $T_{ent}$ and a DOC exit temperature $T_{doc}$, respectively.

The engine E, the intake valve 16, the EGR valve 22, the exhaust pipe injector 24, and the temperature sensors 26 and 27 are connected to an ECU (Electronic Control Unit) 28. The ECU 28 controls the operation of the engine E, the opening degree of the intake valve 16 and the EGR valve 22, the exhaust pipe injection of the exhaust pipe injector 24 and the like at the same time when signals from the temperature sensors 26 and 27 are input. In the ECU 28, additionally, signals from various sensors (for example, MAF (Mass Air Flow) sensor for detecting inhaled air mass) mounted on a vehicle are input or failure diagnostics (OBD diagnostics (On-Board Diagnostics)) and the like of the DOC 23 are performed.

In the DPF system 10, when the PM deposited on the DPF 25 becomes more than a certain amount, the temperature of the exhaust gas of the engine out is increased by controlling the engine E and is further increased by injecting a fuel from the exhaust pipe injector 24 and then combusting the fuel using the DOC 23, resulting in performing DPF forcible regeneration which combusts and removes the PM with high-temperature exhaust gas.

At this time, if the injection amount of the exhaust pipe injector 24 decreases due to manufacturing variation or age deterioration, the temperature of the exhaust gas may become unstable and the DPF regeneration may not be performed.

Therefore, in the DPF system 10 according to the present embodiment, the ECU 28 is equipped with a SV ratio determining device 29 that determines an exhaust gas SV ratio by measuring flow rate V of the exhaust gas during the DPF forcible regeneration and an injector diagnosing device 30 to which an indication-injection amount $Q_{req}$ of the exhaust pipe injector 24, the DOC entrance temperature $T_{ent}$, the DOC exit temperature $T_{doc}$, and the exhaust gas SV ratio are input to diagnose a decrease amount in an actual injection amount of the exhaust pipe injector 24.

Furthermore, the injector diagnosing device 30 includes a heat-generation region determining unit 31 that determines whether or not the DOC entrance temperature $T_{ent}$ and the exhaust gas SV ratio are within a theoretical heat-generation region and an actual injection amount diagnosing unit 32 that diagnoses the decrease amount in the actual injection amount of the exhaust pipe injector 24 when the DOC entrance temperature $T_{ent}$ and the exhaust gas SV ratio are within the theoretical heat-generation region (in addition, a theoretical heat-generation region R will be described later).

The SV ratio determining device 29 determines the exhaust gas SV ratio (ratio of the flow rate V of the exhaust gas to a volume of the DOC 23) of the exhaust gas by measuring the flow rate V of the exhaust gas from an input value (intake air mass) of the MAF sensor and an injection indicating value of an in-cylinder injector.

The heat-generation region determining unit 31 of the injector diagnosing device 30 is constructed so as to determine whether or not the DOC entrance temperature $T_{ent}$ and the exhaust gas SV ratio are within the theoretical heat-generation region R. The theoretical heat-generation region R is an exhaust gas condition when fuel added from the exhaust pipe injector 24 is completely combusted with the DOC 23 and is previously obtained by a test operation of the DPF system 10.

Figure 3:
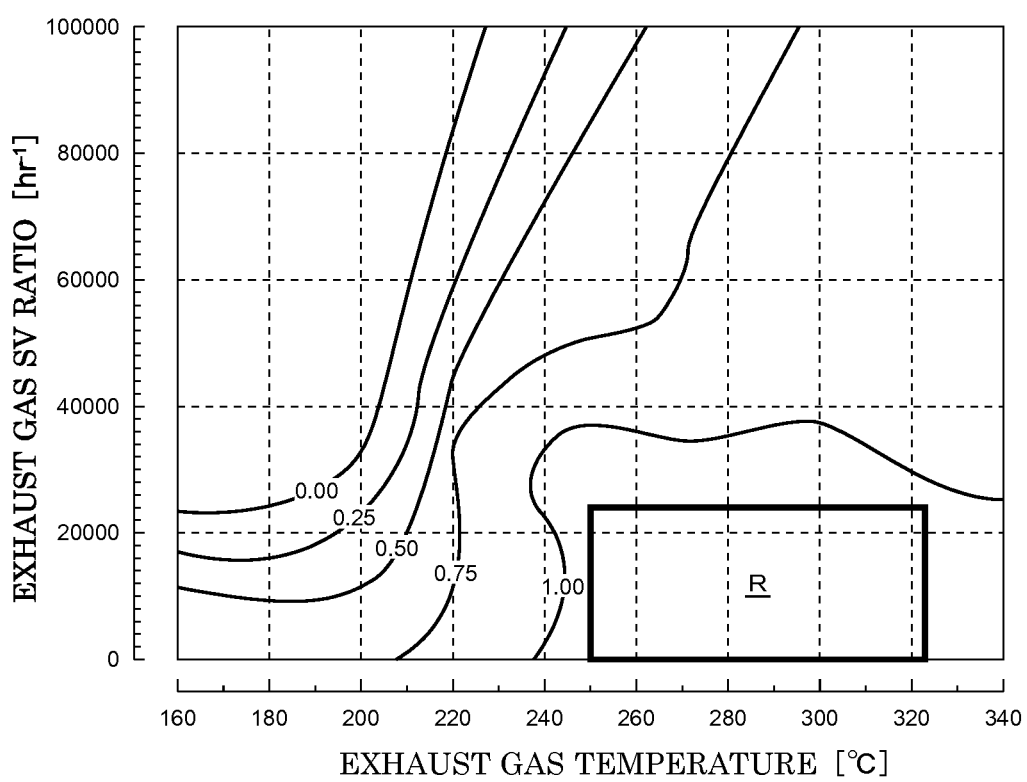
FIG. 3 is a diagram illustrating theoretical heat-generation regions and heat-generation coefficients of DOC.

FIG. 3 illustrates the relation between the theoretical heat-generation region R obtained by the test operation of the DPF system 10 and the temperature (DOC entrance temperature $T_{ent}$) of the exhaust gas and the exhaust gas SV ratio. Under conditions that the DOC entrance temperature $T_{ent}$ is low and the exhaust gas SV ratio is high, the exhaust pipe injection fuel is not completely combusted, and a heat-generation coefficient (heat-generation amount to exhaust injection amount) decreases. Meanwhile, under conditions that the DOC entrance temperature $T_{ent}$ is high and the exhaust gas SV ratio is low, the exhaust pipe injection fuel is completely combusted, and a heat-generation coefficient becomes one (that is, theoretical heat-generation amount). In the DPF system 10 according to the present embodiment, the theoretical heat-generation region R is defined by ranges from 250° C. or more to about 323° C. or less in the DOC entrance temperature $T_{ent}$ and from 0 or more to 25000 or less in the exhaust gas SV ratio. However, the present invention does not particularly limit a setting aspect of the theoretical heat-generation region R, and can appropriately set the theoretical heat-generation region R according to characteristics of the DOC 23 or configurations of the DPF system 10.

The actual injection amount diagnosing unit 32 of the injector diagnosing device 30 diagnoses the indication-injection amount $Q_{req}$ of the exhaust pipe injector 24, temperature difference $\Delta T$ between the DOC entrance and exit (that is, temperature difference between the DOC exit temperature $T_{doc}$ and the DOC entrance temperature $T_{ent}$), and the decrease amount in the actual injection amount of the exhaust pipe injector 24 from the flow rate V of the exhaust gas, when the heat-generation region determining unit 31 determines that the DOC entrance temperature $T_{ent}$ and the exhaust gas SV ratio are within the above-described theoretical heat-generation region R.

A method of diagnosing the decrease amount in the actual injection amount by the actual injection amount diagnosing unit 32 will now be described in detail.

First, the actual injection amount diagnosing unit 32 reads the flow rate V of the exhaust gas measured by the SV ratio determining device 29 and calculates an actual heat-generation amount $C_1$ [J/s] of the DOC 23 by the temperature difference $\Delta T$ [K] between the DOC entrance and exit, the flow rate V [Kg/s] of the exhaust gas, and a specific heat of the exhaust gas [J/Kg*K] (constant number).

Actual heat-generation amount $C_1$ [J/s]=temperature difference $\Delta T$ [K] between the DOC entrance and exit * flow rate V [Kg/s] of the exhaust gas*specific heat of the exhaust gas [J/Kg*K]

By integrating the calculated actual heat-generation amount $C_1$, an integration value $J_1$ of the actual heat-generation amount $C_1$ is calculated.

At the same time, a theoretical heat-generation amount $C_2$ is calculated by a low heat-generation amount 38.2 [MJ/L] of light oil and the indication-injection amount $Q_{req}$ [L] of the exhaust pipe injector 24, and an integration value $J_2$ of the theoretical heat-generation amount $C_2$ is calculated by integrating the theoretical heat-generation amount $C_2$.

Theoretical heat-generation amount $C_2$ [J/S] =low heat-generation amount 38.2 [MJ/L] of light oil*indication-injection amount $Q_{req}$ [L]

The actual injection amount diagnosing unit 32 calculates the integration values $J_1$ and $J_2$ of the actual heat-generation amount $C_1$ and the theoretical heat-generation amount $C_2$ when the conditions of the exhaust gas are within the theoretical heat-generation region R, but the theoretical heat-generation amount $C_2$ can be originally obtained on the DOC 23 in this region. Accordingly, if the DOC 23 or the exhaust pipe injector 24 has no failure, the actual heat-generation amount $C_1$ may become the value close to the theoretical heat-generation amount $C_2$.

However, in a case where there is a gap between the injection indicating value and the actual value of the exhaust pipe injector 24 (that is, in a case where the actual injection amount is decreased from the indication-injection amount $Q_{req}$ due to the manufacturing deviation or the age deterioration of the exhaust pipe injector 24), the actual heat-generation amount $C_1$ becomes lower than the theoretical heat-generation amount $C_2$. For example, when the actual value is only 70% with respect to the injection indicating value by clogging the exhaust pipe injector 24, the heat-generation amount becomes 70%.

Therefore, the actual injection amount diagnosing unit 32 diagnoses the decrease amount in the actual injection amount of the exhaust pipe injector 24 from the integration values $J_1$ and $J_2$ of the calculated actual heat-generation amount $C_1$ and the theoretical heat-generation amount $C_2$. In the present embodiment, the decrease amount in the actual injection amount is estimated as a ratio ($J_1 \div J_2$) of the integration value $J_1$ of the actual heat-generation amount $C_1$ to the integration value $J_2$ of the theoretical heat-generation amount $C_2$. The present invention does not particularly limit the integration time of the actual heat-generation amount $C_1$ and the theoretical heat-generation amount $C_2$, and may appropriately set the integration time, but the diagnostics may be instantly stopped in order to prevent erroneous diagnostics when the DOC entrance temperature $T_{ent}$ and the exhaust gas SV ratio are outside the theoretical heat-generation region R during the diagnostics (during the integration).

In addition, the injector diagnosing device 30 sets a correction coefficient f which corrects the injection amount of the exhaust pipe injector 24 from the decrease amount in the actual injection amount diagnosed by the actual injection amount diagnosing unit 32 to correct the injection amount of the exhaust pipe injector 24. More specifically, the correction is performed such that the actual injection amount increases by setting an inverse number (that is, "integration value $J_2$ of theoretical heat-generation amount $C_2$"÷"integration value $J_1$ of actual heat-generation amount $C_1$") of the decrease amount in the actual injection amount to the correction coefficient f and multiplying the correction coefficient f by the indication-injection amount $Q_{req}$ of the exhaust pipe injector 24. The present invention does not limit a correction method of the indication-injection amount $Q_{req}$, and may gradually perform, for example, the correction of the indication-injection amount $Q_{req}$ while diagnosing with several DPF forcible regeneration in order to further enhance precision of the correction.

Furthermore, the injector diagnosing device 30 is configured to detect the failure of the exhaust pipe injector 24 when the correction coefficient f becomes lager than a failure determining threshold value $F_{mal}$ which is previously set. When the injector diagnosing device 30 detects the failure, it may light a warning lamp provided inside a cabin of the vehicle in order to promote a driver to clean or replace the exhaust pipe injector 24. The present invention does not particularly limit the setting value of the failure determining threshold value $F_{mal}$, and may appropriately change the setting value of the failure determining threshold value $F_{mal}$ according to characteristics of the DOC 23 and the exhaust pipe injector 24 or configurations of the DPF system 10.

Moreover, since deterioration of the actual heat-generation amount $C_1$ may occasionally be caused by deterioration in catalyst function of the DOC 23, the actual injection amount diagnosing unit 32 according to the invention is assumed to diagnose the decrease amount in the actual injection amount from the OBD diagnostics of the DOC 23 that is taking place in the ECU 28 only when the DOC 23 is diagnosed to be normal.

Figure 2:
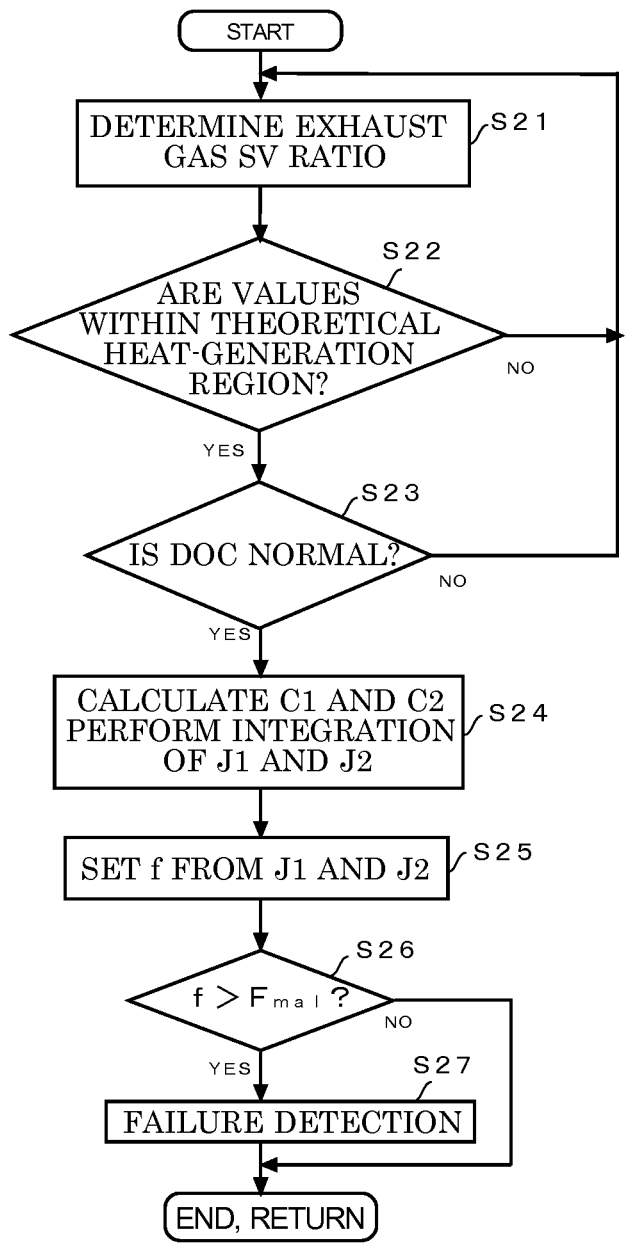
FIG. 2 is a flowchart illustrating operations of the DPF system according to the present invention.

Next, operations of the DPF system 10 will be described with reference to FIG. 2.

During the DPF forcible regeneration, the SV ratio determining device 29 and the injector diagnosing device 30 provided in the DPF system 10 repeat the following operations.

First, in step S21, the SV ratio determining deice 29 measures the flow rate V of the exhaust gas based on the injection indication value of the MAF sensor and the in-cylinder injector, which is read from the ECU 28, and determines the exhaust gas SV ratio from the measured value, and then the operation proceeds to step S22.

Next, in step S22, the heat-generation region determining unit 31 of the injector diagnosing device 30 determines whether or not the input value (DOC entrance temperature $T_{ent}$) from the temperature sensor 26 and the determined value (exhaust gas SV ratio) of the SV ratio determining device 29 are within the theoretical heat-generation region R. When the DOC entrance temperature $T_{ent}$ and the exhaust gas SV ratio are within the theoretical heat-generation region R, the operation proceeds to step S23 in order to diagnose the decrease amount in the actual injection amount. Meanwhile, When the DOC entrance temperature $T_{ent}$ and the exhaust gas SV ratio are not within the theoretical heat-generation region R, the operation is returned to step S21 since the decrease amount in the actual injection amount may not be diagnosed.

In step S23, the injector diagnosing means 30 determines whether or not the DOC 23 is normal from the OBD diagnostics of the DOC 23 performed by the ECU 28. When the DOC 23 is not normal, since the decrease amount in the actual injection amount cannot be diagnosed, the operation is returned to step S21. Meanwhile, when it determines that the DOC 23 is normal, the operation proceeds to step S24 in order to diagnose the decrease amount in the actual injection amount.

In step S24, the actual injection amount diagnosing unit 32 of the injector diagnosing device 30 performs the integration by calculating the actual heat-generation amount $C_1$ and the theoretical heat-generation amount $C_2$ of the DOC 23 from the indication-injection amount $Q_{req}$ of the exhaust pipe injector 24, the DOC entrance temperature $T_{ent}$, the DOC exit temperature $T_{doc}$, and the flow rate V of the exhaust gas measured by the SV ratio determining device 29 to diagnose the decrease amount $(J_1 \div J_2)$ in the actual injection amount from the integration values $J_1$ and $J_2$ of these actual heat-generation amount $C_1$ and the theoretical heat-generation amount $C_2$.

Then, in step S25, the injector diagnosing device 30 sets the correction coefficient f from the decrease amount in the actual injection amount diagnosed by the actual injection amount diagnosing unit 32 to make the exhaust pipe injection from the exhaust pipe injector 24 with the value obtained by multiplying the set correction coefficient f by the indication-injection amount $Q_{req}$. In the present embodiment, the correction coefficient f is set to the inverse number (that is, [integration value $J_2$ of theoretical heat-generation amount $C_2$]÷[integration value $J_1$ of actual heat-generation amount $C_1$]) of the decrease amount in the actual injection amount.

Then, in step S26, the injector diagnosing device 30 performs the failure determination of the exhaust pipe injector 24 by comparing the correction coefficient f with the failure determining threshold value $F_{mal}$. When the correction coefficient f is not more than the failure determining threshold value $F_{mal}$, the operation is ended without detecting the failure of the exhaust pipe injector 24. Meanwhile, when the correction coefficient f exceeds the failure determining threshold value $F_{mal}$, the operation proceeds to step S27 and is ended by detecting the failure of the exhaust pipe injector 24. In addition, the correction coefficient f is reset by an operator after the cleaning or the replacement of the exhaust pipe injector 24.

Moreover, when the DOC entrance temperature $T_{ent}$ and the exhaust gas SV ratio are outside the theoretical heat-generation region R during the diagnostics of the decrease amount in the actual injection amount, the operation is ended by instantly stopping the diagnostics in order to prevent the erroneous diagnostics.

In short, the DPF system 10 according to the present embodiment calculates the actual heat-generation amount $C_1$ of the DOC 23 by the exhaust pipe injection and then obtains the ratio (heat-generation coefficient) to the theoretical heat-generation amount $C_2$ (that is, theoretical heat-generation amount of light oil) of the DOC 23 only when the DOC entrance temperature $T_{ent}$ and the exhaust gas SV ratio is within the theoretical heat-generation region R to diagnose the decrease amount in the actual injection amount of the exhaust pipe injector 24 and perform the failure determination of the exhaust pipe injector 24 at the same time.

In this manner, it is possible to perform exactly the diagnostics of the actual injection amount and the failure determination of the exhaust pipe injector 24 with a simple structure without causing additional costs.

In the present embodiment, further, the indication-injection amount $Q_{req}$ of the exhaust pipe injector 24 is increasingly corrected based on the diagnosed decrease amount in the actual injection amount.

Thus, even though the change in the injection amount occurs due to the manufacturing variation or the age deterioration of the exhaust pipe injector 24, it is possible to ensure the temperature stability during the DPF forcible regeneration or the stability in the rich reduction of the LNT catalyst.

The present invention can be modified in various ways without being limited to the above embodiments.

In order to diagnose the decrease amount in the actual injection amount during the DPF forcible regeneration, the present embodiment may promptly correct the indication-injection amount $Q_{req}$ according to the results of the diagnostics, but the injector diagnosing device 30 may continuously perform the integration of the actual heat-generation amount $C_1$ and the theoretical heat-generation amount $C_2$ within the theoretical heat-generation region R until the completion of the DPF forcible regeneration and perform the diagnostics after the DPF forcible regeneration is completed, for example. Thereby, it is possible to reduce the impact on the diagnostics by the disturbance incurred during the DPF forcible regeneration, resulting in performing the diagnostics and correction more accurately.

The invention claimed is:

1. A diesel particulate filter system for performing a diesel particulate filter forcible regeneration that combusts and removes particulate matter deposited in a diesel particulate filter by injecting fuel from an exhaust pipe injector and oxidizing and combusting the injected fuel with a diesel oxidation catalyst, the diesel particulate filter system comprising:
   temperature sensors on an entrance side and an exit side of the diesel oxidation catalyst to detect a diesel oxidation catalyst entrance temperature and a diesel oxidation catalyst exit temperature, respectively, during the diesel particulate filter forcible regeneration;
   a space velocity ratio determining device that determines an exhaust gas space velocity ratio by measuring a flow rate of exhaust gas during the diesel particulate filter forcible regeneration; and
   an injector diagnosing device including:
      a heat-generation region determining unit to which detection values of the temperature sensors and a determination value of the space velocity ratio determining device are input to determine whether or not these values are within a theoretical heat-generation region; and
      an actual injection amount diagnosing unit that diagnoses a decrease amount in an actual injection amount of the exhaust pipe injector, when the detection values of the temperature sensors and the determination value of the space velocity ratio determining device are within the theoretical heat-generation region, but not when these values are outside this region.

2. The diesel particulate filter system according to claim 1, wherein the actual injection amount diagnosing unit performs an integration by calculating an actual heat-generation amount of the diesel oxidation catalyst from a temperature difference between the entrance and the exit of the diesel oxidation catalyst and the flow rate of the exhaust gas, and performs an integration by calculating a theoretical heat-generation amount of the diesel oxidation catalyst from an indication-injection amount of the exhaust pipe injector to diagnose the decrease amount in the actual injection amount of the exhaust pipe injector from integration values of the actual heat-generation amount and the theoretical heat-generation amount.

3. The diesel particulate filter system according to claim 2, wherein the injector diagnosing device corrects the indication-injection amount of the exhaust pipe injector based on the decrease amount in the diagnosed actual injection amount.

4. The diesel particulate filter system according to claim 3, wherein the injector diagnosing device sets a correction coefficient for correcting the indication-injection amount of the exhaust pipe injector based on the decrease amount in the diagnosed actual injection amount and detects a failure of the exhaust pipe injector when the correction coefficient exceeds a failure determining threshold value which is previously set.

* * * * *